United States Patent
Johnson et al.

(10) Patent No.: US 8,219,698 B2
(45) Date of Patent: *Jul. 10, 2012

(54) REMOTE OPERATION OF PROCESS CONTROL EQUIPMENT OVER CUSTOMER SUPPLIED NETWORK

(75) Inventors: Alexander Johnson, Houston, TX (US); Chris J. Smith, Hornsby (AU)

(73) Assignee: Invensys Systems, Inc., Foxboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/088,127

(22) Filed: Apr. 15, 2011

(65) Prior Publication Data

US 2011/0196512 A1    Aug. 11, 2011

Related U.S. Application Data

(63) Continuation of application No. 12/822,431, filed on Jun. 24, 2010, now Pat. No. 7,930,417, which is a continuation of application No. 11/844,080, filed on Aug. 23, 2007, now Pat. No. 7,747,767.

(60) Provisional application No. 60/823,608, filed on Aug. 25, 2006.

(51) Int. Cl.
*G06F 15/16* (2006.01)

(52) U.S. Cl. ........ 709/230; 709/201; 709/217; 709/224; 709/225; 709/227; 709/238; 709/245

(58) Field of Classification Search ................. 709/201, 709/217, 224, 225, 227, 230, 238, 246
See application file for complete search history.

(56) References Cited

U.S. PATENT DOCUMENTS

| | | | |
|---|---|---|---|
| 5,621,654 | A | 4/1997 | Cohen et al. |
| 6,104,716 | A | 8/2000 | Crichton et al. |
| 6,400,722 | B1 | 6/2002 | Chuah et al. |
| 6,751,562 | B1 | 6/2004 | Blackett et al. |
| 6,810,259 | B1 | 10/2004 | Zhang |
| 6,993,403 | B1 | 1/2006 | Dadebo et al. |
| 7,127,328 | B2 | 10/2006 | Ransom |
| 7,200,869 | B1 * | 4/2007 | Hacherl et al. ................. 726/27 |
| 7,233,830 | B1 | 6/2007 | Callaghan et al. |
| 7,398,308 | B2 * | 7/2008 | Friedel et al. ................. 709/223 |
| 7,693,581 | B2 | 4/2010 | Callaghan et al. |
| 7,747,767 | B2 | 6/2010 | Johnson et al. |
| 7,761,910 | B2 | 7/2010 | Ransom et al. |
| 2003/0060900 | A1 | 3/2003 | Lo et al. |
| 2003/0110302 | A1 | 6/2003 | Hodges et al. |

(Continued)

OTHER PUBLICATIONS

International Search Report and Written Opinion issued in PCT/US07/76642, dated Feb. 20, 2008.

*Primary Examiner* — Michael Won
(74) *Attorney, Agent, or Firm* — Edward S. Jarmolowicz

(57) ABSTRACT

A DCS protocol message addressed to a remote DCS station is generated at a local distributed control system (DCS). The DCS protocol message is received at a local tunneling device. The local tunneling device packages the DCS protocol message into a SCADA protocol message. The SCADA protocol message is transmitted from the local tunneling device to a remote tunneling device. The remote tunneling device receives the SCADA protocol message. The SCADA protocol message is unpackaged into a DCS protocol message at the remote tunneling device, and the DCS protocol message is placed on to a remote DCS such that it flows to the remote station. The DCS protocol message is received at the remote station.

22 Claims, 8 Drawing Sheets

U.S. PATENT DOCUMENTS

| | | |
|---|---|---|
| 2003/0188001 A1 | 10/2003 | Eisenberg et al. |
| 2004/0162786 A1* | 8/2004 | Cross et al. .................... 705/59 |
| 2008/0052356 A1 | 2/2008 | Johnson et al. |
| 2008/0109870 A1* | 5/2008 | Sherlock et al. ................. 726/1 |
| 2008/0274689 A1 | 11/2008 | Kuban |
| 2009/0281679 A1 | 11/2009 | Taft et al. |
| 2010/0262707 A1 | 10/2010 | Johnson et al. |

* cited by examiner

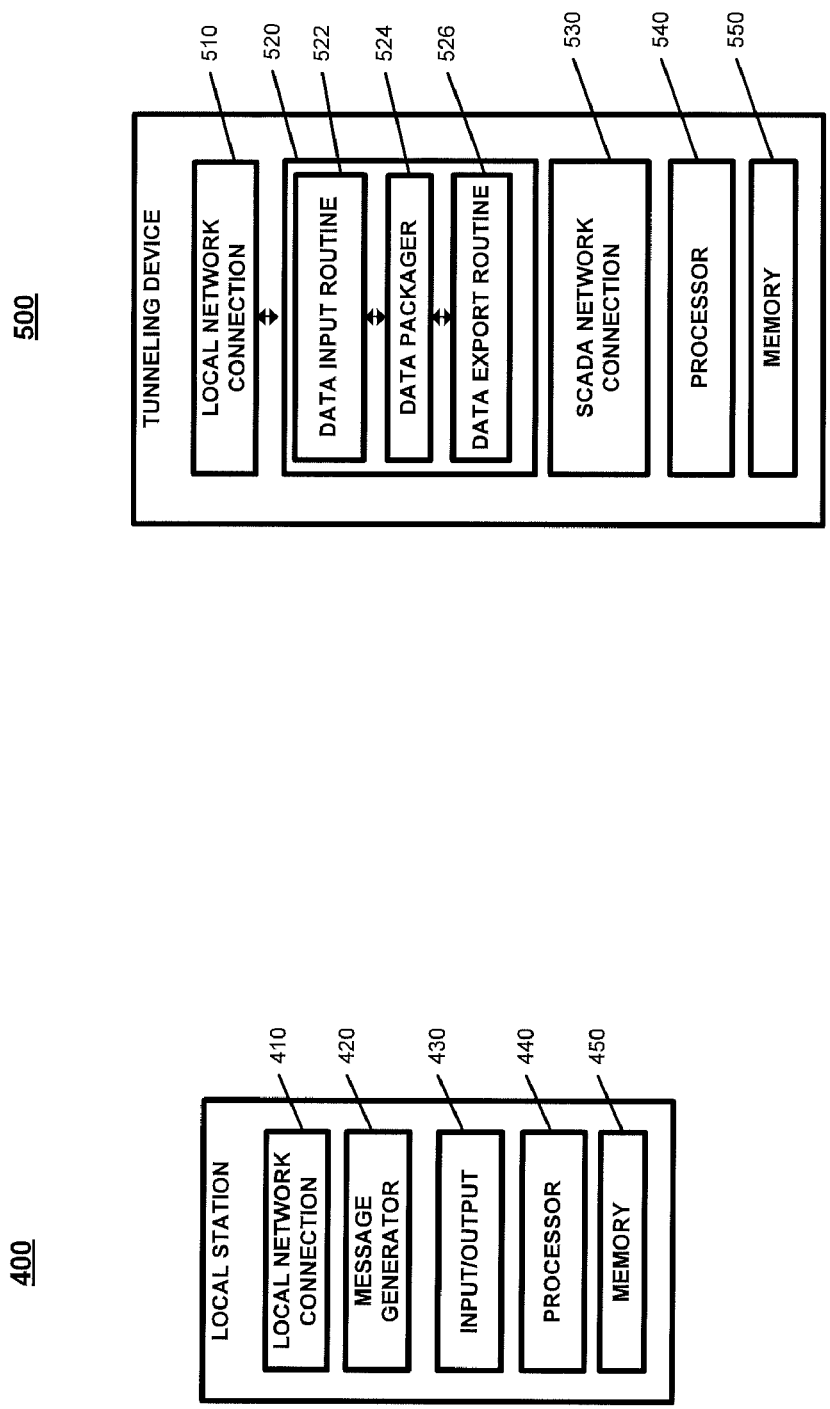

REMOTE OPERATION OF PROCESS CONTROL EQUIPMENT OVER CUSTOMER SUPPLIED NETWORK

This application is a continuation of U.S. patent application Ser. No. 12/822,431, filed Jun. 24, 2010, titled "REMOTE OPERATION OF PROCESS CONTROL EQUIPMENT OVER CUSTOMER SUPPLIED NETWORK," now U.S. Pat. No. 7,930,417, which is a continuation of U.S. patent application Ser. No. 11/844,080, filed Aug. 23, 2007, titled "REMOTE OPERATION OF PROCESS CONTROL EQUIPMENT OVER CUSTOMER SUPPLIED NETWORK," now U.S. Pat. No. 7,747,767, which claims the benefit of U.S. Provisional Application No. 60/823,608, filed on Aug. 25, 2006. The contents of the prior applications are incorporated herein by reference.

FIELD

The present disclosure generally relates to human-machine interaction, and one particular implementation relates to an enhanced architecture for data acquisition and monitoring.

BACKGROUND

Supervisory Control And Data Acquisition ("SCADA") systems are large-scale, distributed measurement and control systems, generally used to monitor or control chemical, physical or transport processes, where the term SCADA usually refers to the central system that monitors and controls a complete site. SCADA systems are often distributed over vast geographic areas.

Distributed Control Systems ("DCSs") perform a similar function to SCADA systems, although they are generally concentrated in a single geographical area, such as a single plant. Unlike SCADA systems, DCSs operate using high-bandwidth, high reliability communication links, thus providing a significant advantage at the local level. As components of a DCS are dispersed over larger geographic areas, the DCS becomes harder to implement.

SUMMARY

The benefits of device integration are of value to SCADA sites. Accordingly, the approach described herein addresses an enhanced functionality for SCADA networks.

According to one general implementation, a system for data acquisition and monitoring includes a local distributed control system (DCS). The DCS includes a local station configured to generate a DCS protocol message addressed to a remote station, and a local tunneling device configured to receive the DCS protocol message, package the DCS protocol message into a Supervisory Control and Data Acquisition (SCADA) protocol message, and transmit the SCADA protocol message. The system also includes a remote DCS including a remote tunneling device configured to receive the SCADA protocol message, unpack the SCADA protocol message into a DCS protocol message, and transmit the DCS protocol message to the remote station.

Implementations may include one or more of the following features. The local station may be a field device, and the remote station may be a workstation configured to transmit commands to the field device and receive data from the field device. The system also may include a data collector disposed between the local tunneling device and the remote tunneling device. The data collector may be configured to pass the SCADA protocol message from the local tunneling device to the remote tunneling device without modifying the SCADA protocol message. The data collector may be configured to access the SCADA protocol message. The system also may include more than one local tunneling device, and the data collector may be configured to receive and aggregate SCADA protocol messages from the more than one local tunneling device. The SCADA protocol may include a Distributed Network Protocol (DNP). The SCADA protocol may include an IEC 101 protocol.

In another general implementation, a DCS protocol message addressed to a remote station is received from a local distributed control system (DCS) station. The DCS protocol message includes a command configured to operate the remote station. The DCS protocol message is packaged into a Supervisory Control and Data Acquisition (SCADA) protocol message and transmitted toward the remote station. A return SCADA protocol message is received from the remote station. The return message is unpacked into a DCS protocol message and transmitted to the local DCS station.

Implementations may include one or more of the following features. The SCADA protocol may include a Distributed Network Protocol (DNP). The SCADA protocol may include an IEC 101 protocol. Packaging the message may include determining a size of the DCS protocol message, comparing the size to a threshold size, and dividing the DCS protocol message into portions prior to transmitting the DCS message, each portion being less than the threshold size. The local DCS station may be a workstation configured to transmit commands to the remote station and receive data from the remote station, and the remote station may be a field device. The return message may include more than one portion, the portions may be received in an order other than an order in which the portions were sent, and unpacking the return message may include converting the return message having more than one portion into an unpackaged message with one portion that includes the received portions arranged in the order in which the portions were sent. The return message may include information related to one or more devices in communication with the remote station. The device may be one or more field devices such as a valve, a valve positioner, a temperature transmitter, a pressure transmitter, a flow transmitter, and a controller.

In other implementations, a second DCS protocol message may be received from another local DCS station, the second message being addressed to a second remote station. The second DCS protocol message may be packaged into a SCADA protocol message, and the second packaged message may be transmitted toward the second remote station, where the second packaged message is transmitted without regard to the transmission of the first packaged message. Transmitting the second packaged message without regard to the transmission of the first packaged message may include interleaving the second packaged message and the first packaged message.

Implementations of any of the techniques described above may include a method or process, an apparatus or system, or computer software on a computer-accessible medium. The details of particular implementations are set forth in the accompanying drawings and description below. Other features will be apparent from the following description, including the drawings, and the claims.

DESCRIPTION OF DRAWINGS

FIG. 4 is a block diagram of an exemplary local station.

FIG. 5 is a block diagram of an exemplary tunneling device.

Like reference symbols in the various drawings indicate like elements.

DETAILED DESCRIPTION

With regard to SCADA systems, the bulk of site control is typically performed automatically by a Remote Terminal Unit ("RTU") or by a Programmable Logic Controller ("PLC"). Data acquisition begins at the RTU or PLC level, and includes meter readings and equipment status messages which are communicated to the workstation via low-bandwidth communication networks. Once the data is received by the workstation, it is compiled and formatted in such a way that an operator, using human-machine interaction, can make appropriate supervisory decisions that may be required to override normal RTU controls.

The geographic dispersion of SCADA systems generally requires that protocols be developed to run reliably over fundamentally unreliable and bandwidth limited networks. Dealing with these issues has been the central focus of most SCADA development activity. At the same time, DCS vendors have had access to high performance networks since their inception and have used their resources to address other problems. One of those problems is the integration of field devices into their systems such that the overall availability and utilization of the plant assets is increased.

In an example SCADA system, a main terminal unit located in a centralized location is able to communicate with remote field devices which are physically disposed in locations which are inhospitable to continuous human monitoring. The communication network between the remote field devices and the main terminal unit is typically a low-bandwidth and unreliable communication network.

In an example DCS system, a highly reliable and high-bandwidth communication network links a main terminal unit to field devices which are located within a limited geographic area such as a process plant or other type of manufacturing facility. For example, the field device may be a positioner that detects the movement of a valve and the data communicated by the network is critical to determining whether the valve is nearing failure, potentially affecting operations of the entire plant.

Although SCADA systems are ubiquitous, it is a challenge to integrate field devices, such as positioners, valve positioners that detect and control movement of valves, temperature sensors, controllers, and flow meters in these systems due to communication reliability problems inherent to the associated communication networks. However, it is increasingly important to provide for enhanced monitoring of field devices. Due to the prevalence of SCADA systems, it is desirable to provide for enhanced monitoring of field devices using legacy equipment. In this regard, an architecture is provided herein capable of operating a small DCS in a remote location, via a larger customer-supplied network, such as a legacy SCADA system.

Figure 1:
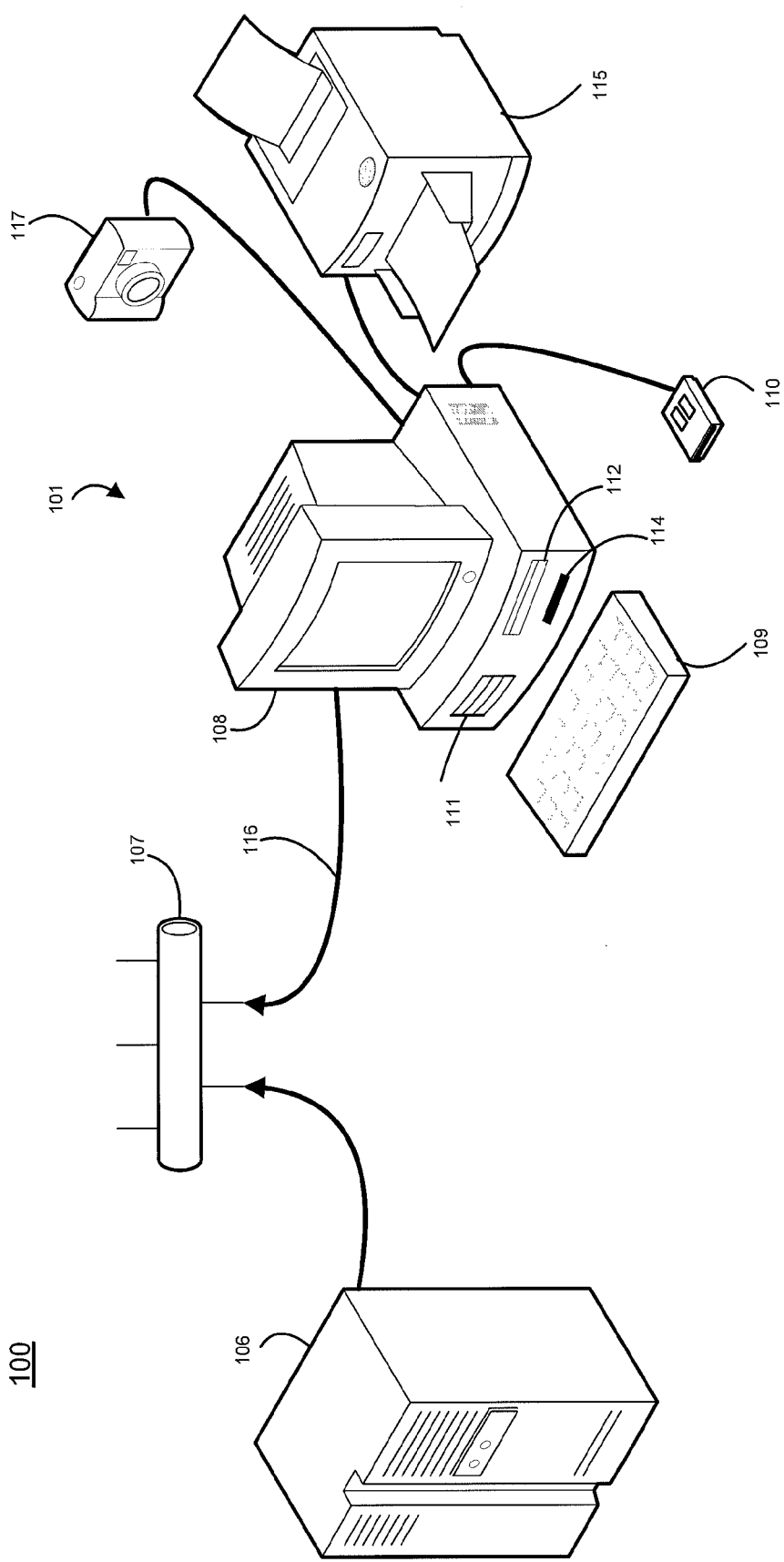
FIG. 1 depicts the exterior appearance of an exemplary system.

FIG. 1 depicts the exterior appearance of an example system 100. Briefly, system 100 communicates with the system control device 106, via a control network 107. The system control device 106 may be, for example, a SCADA device that receives data from and transmits data to a SCADA network.

As shown in FIG. 1, the hardware environment of a computer 101 includes a display monitor 108 for displaying text and images to a user, a keyboard 109 for entering text data and user commands into the computer 101, a mouse 110 for pointing, selecting and manipulating objects displayed on the display monitor 108, a fixed disk drive 111, a removable disk drive 112, a tape drive 114, a hardcopy output device 115, and a computer network connection 116.

The display monitor 108 displays the graphics, images, and text that comprise the user interface for the software applications used by the system 100, as well as the operating system programs necessary to operate the computer 101. A user uses the keyboard 109 to enter commands and data to operate and control the computer operating system programs as well as the application programs. The user uses the mouse 110 to select and manipulate graphics and text objects displayed on the display monitor 108 as part of the interaction with and control of the computer 101 and applications running on the computer 101. The mouse 110 may be any type of pointing device, and may be a joystick, a trackball, a touch-pad, or other pointing device.

In a further implementation, the fixed disk drive 111 itself may include a number of physical drive units, such as a redundant array of independent disks ("RAID"), or may be a disk drive farm or a disk array that is physically located in a separate computing unit. Such computer readable memory media allow the computer 101 to access computer-executable process steps, application programs and the like, stored on removable and non-removable memory media.

The computer network connection 116 may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The control network 107 may be a LAN network, a corporate or government WAN network, the Internet, or other network. The computer 101 is directly or indirectly coupled to the system control device 106 via the control network 107, so as to effectuate unidirectional or bidirectional transmission of data between the computer 101 and the system control device 106.

The computer network connection 116 may be a wired or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, an orthogonal frequency division multiplexing ("OFDM") ultra wide band ("UWB") wireless connector, a time-modulated ultra wide band ("TM-UWB") wireless connector, or other wireless connector. Example wired connectors include, for example, a IEEE®-1394 FIREWIRE® connector, a Universal Serial Bus ("USB") connector, a serial port connector, a parallel port connector, or other wired connector.

The removable disk drive 112 is a removable storage device that is used to off-load data from the computer 101 or upload data onto the computer 101. The removable disk drive 112 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, thumb drive, pen drive, key drive, a High-Density Digital Versatile Disc ("HD- DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 111 or on removable media for the removable disk drive 112.

The tape drive 114 is a tape storage device that is used to off-load data from the computer 101 or to upload data onto the computer 101. The tape drive 114 may be a quarter-inch cartridge ("QIC"), 4 mm digital audio tape ("DAT"), 8 mm digital linear tape ("DLT") drive, or other type of tape.

The hardcopy output device 115 provides an output function for the operating system programs and applications. The hardcopy output device 115 may be a printer or any output device that produces tangible output objects, including textual or image data or graphical representations of textual or image data. While the hardcopy output device 115 is depicted as being directly connected to the computer 101, it need not be. For instance, the hardcopy output device 115 may be connected to computer 101 via a network interface, such as a wired or wireless network.

The system control device 106 exists remotely on a network, and includes one or more networked data server devices or servers. The system control device 106 executes software which services requests sent by the computer 101, where the system control device 106 may include a server farm, a storage farm, or a storage server.

Although the computer 101 is illustrated in FIG. 1 as a desktop PC, in further implementations the computer 101 may be a laptop, a workstation, a midrange computer, a mainframe, an embedded system, telephone, a handheld or tablet computer, a PDA, or other type of computer.

Although further description of the components which make up the system control device 106 is omitted for the sake of brevity, it suffices to say that the hardware environment of the computer or individual networked computers which make up the system control device 106 is similar to that of the exemplary hardware environment described herein with regard to the computer 101.

Figure 2:
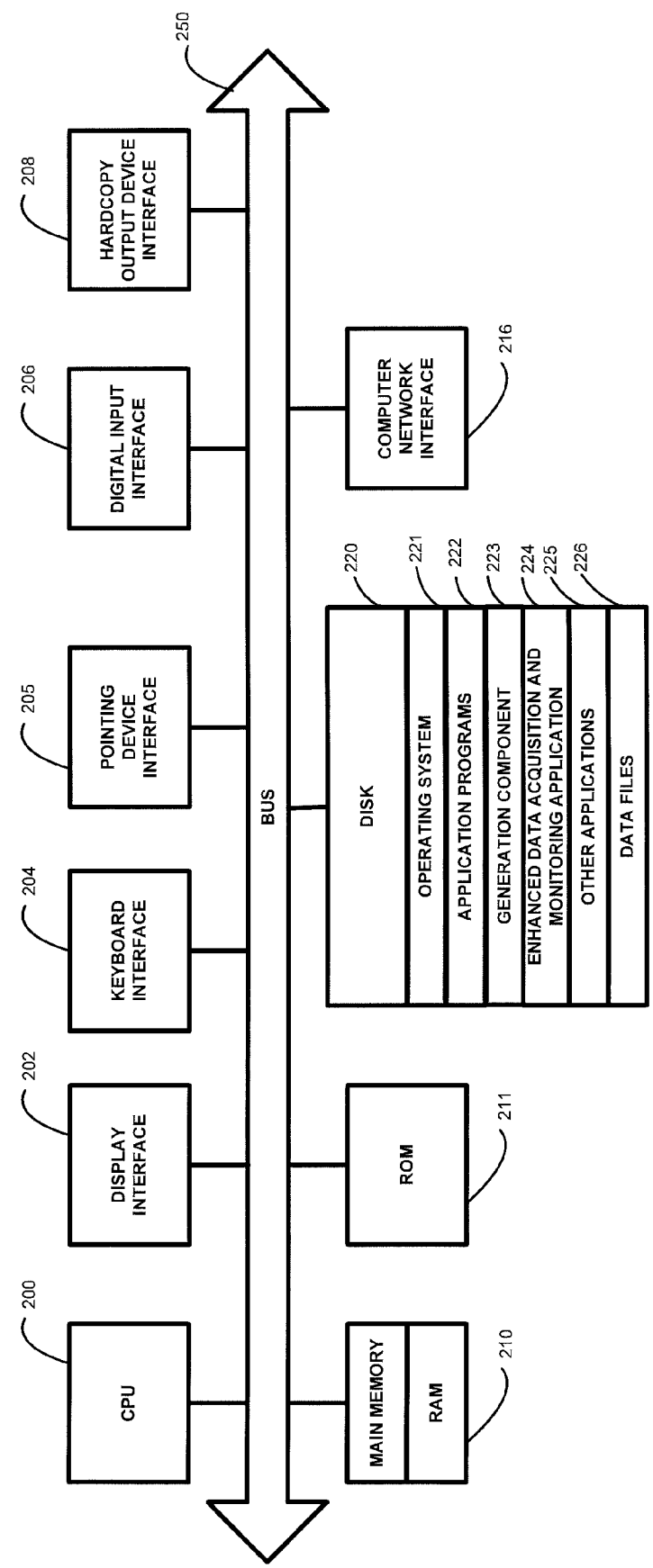
FIG. 2 depicts an example of an internal architecture of the computer shown in FIG. 1.

FIG. 2 depicts an example of an internal architecture of the computer 101. The computing environment includes a computer central processing unit ("CPU") 200 where the computer instructions that comprise an operating system or an application are processed; a display interface 202 which provides a communication interface and processing functions for rendering graphics, images, and texts on the display monitor 108; a keyboard interface 204 which provides a communication interface to the keyboard 109; a pointing device interface 205 which provides a communication interface to the mouse 110 or an equivalent pointing device; a digital input interface 206 which provides a communication interface to a digital input device; a hardcopy output device interface 208 which provides a communication interface to the hardcopy output device 115; a random access memory ("RAM") 210 where computer instructions and data are stored in a volatile memory device for processing by the computer CPU 200; a read-only memory ("ROM") 211 where invariant low-level systems code or data for basic system functions such as basic input and output ("I/O"), startup, or reception of keystrokes from the keyboard 109 are stored in a non-volatile memory device; and optionally a storage 220 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 221, application programs 222 (including generation component 223, enhanced data acquisition and monitoring application 224, and other applications 225 as necessary) and data files 226 are stored; a computer network interface 216 which provides a communication interface to the control network 107 over the computer network connection 116. The constituent devices and the computer CPU 200 communicate with each other over the computer bus 250.

The RAM 210 interfaces with the computer bus 250 so as to provide quick RAM storage to the computer CPU 200 during the execution of software programs such as the operating system application programs, and device drivers. More specifically, the computer CPU 200 loads computer-executable process steps from the fixed disk drive 111 or other memory media into a field of the RAM 210 in order to execute software programs. Data is stored in the RAM 210, where the data is accessed by the computer CPU 200 during execution.

Also shown in FIG. 2, the computer 101 stores computer-executable code for a operating system 221, application programs 222 such as word processing, spreadsheet, presentation, gaming, or other applications. Although it is possible to provide for enhanced data acquisition and monitoring functionality using the above-described implementation, it is also possible to implement the functions according to the present disclosure as a dynamic link library ("DLL"), or as a plug-in to other application programs such as an Internet web-browser such as the MICROSOFT® Internet Explorer web browser.

The computer CPU 200 is one of a number of high-performance computer processors, including an INTEL® or AMD® processor, a POWERPC® processor, a MIPS® reduced instruction set computer ("RISC") processor, a SPARC® processor, an ACORN RISC Machine ("ARM®") architecture processor, a HP ALPHASERVER® processor or a proprietary computer processor for a mainframe. In an additional arrangement, the computer CPU 200 is more than one processing unit, including a multiple CPU configuration found in high-performance workstations and servers, or a multiple scalable processing unit found in mainframes.

The operating system 221 may be MICROSOFT® WINDOWS NT®/WINDOWS® 2000/WINDOWS® XP Workstation; WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPC® based workstations and servers; SYMBIAN OS®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 221 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT® .NET Compact.

Although further description of the internal architecture of the system control device 106 is omitted for the sake of brevity, it suffices to say that the architecture is similar to that of the computer 101.

While FIGS. 1 and 2 illustrate one possible implementation of a computing system that executes program code, or program or process steps, configured to effectuate enhanced data acquisition and monitoring functionality, other types of computers may also be used as well.

Figure 3:
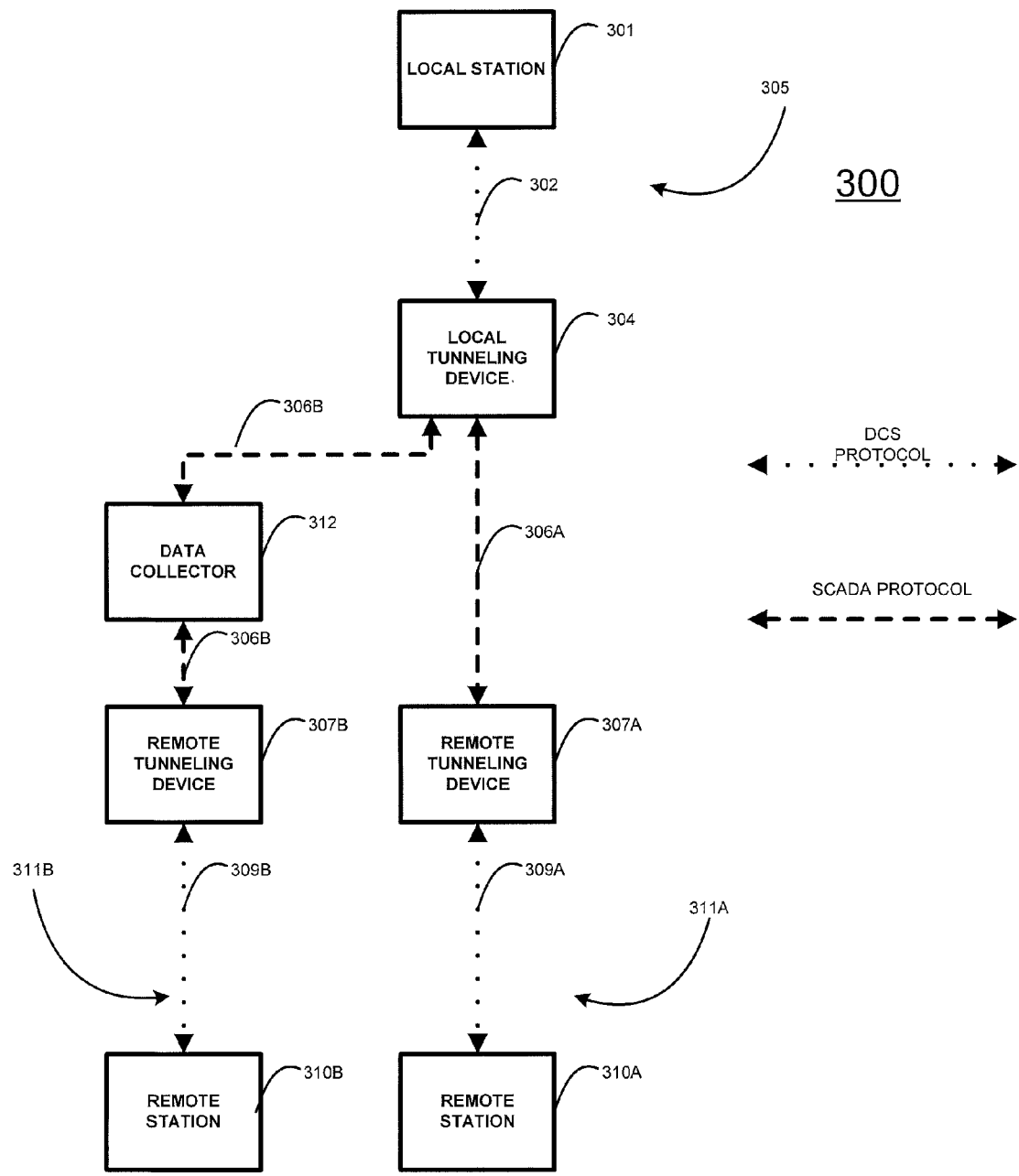
FIG. 3 is a block diagram illustrating an exemplary system architecture for implementing enhanced data acquisition and monitoring functionality.

FIG. 3 is a block diagram illustrating another exemplary system 300. Briefly, the system 300 includes a local DCS further including a local station 301 that generates a message addressed to a remote station 310, and a local tunneling device 304 that receives the message via a DCS protocol. The local tunneling device 304 further packages the message, and to transmit the message via a SCADA protocol. The system 300 also includes a remote DCS further including a remote tunneling device 307 that receives the message via the SCADA protocol, and to un-package the message. The remote tunneling device 307 further transmits the message to the remote station 310, via a DCS protocol.

In more detail, system 300 includes a local station 301 and a local tunneling device 304 that communicate data 302 via a DCS protocol. Although the local station 301 and the local tunneling device 304 are depicted as being directly connected, they need not be. For example, any number of intermediary devices may be interposed between the local station 301 and the local tunneling device 304, as would be typical in a DCS. The local station 301 and the local tunneling device 304 are collectively referred to herein as the local DCS 305.

In the instance where the local station 301 is a main terminal unit, host computer, or InFusion® workstation, the local DCS 305 represents the central subcomponent of the system 300, where data is sent to and received from remote field devices, compiled, and monitored by a human. In the instance where the local station 301 is a remote field device, the local DCS 305 represents the field component, which receives data from and sends data to a central monitoring system. Although the system 300 includes two DCS subsystems, since the transmission of data between the subsystems via the SCADA protocol is transparent to each subsystem, it does not matter if the local DCS 305 represents the centralized hub component or the field component of the overall system 300.

The local tunneling device 304 communicates data 306A with the remote tunneling device 307A using the SCADA protocol, and the remote tunneling device 307A communicates data 309A with a remote station 310A using the DCS protocol. The remote tunneling device 307A and the remote station 310A are collectively referred to herein as the remote DCS 311A. As above, it does not matter if the remote DCS 311A represents the centralized hub component.

In some implementations, the system 300 may include more than one remote tunneling device. In the example shown in FIG. 3, the system 300 includes both the remote tunneling device 307A and the remote tunneling device 307B. For instance, the local tunneling device 304 may transmit the data 306A to the remote tunneling device 307A and transmit the data 306B to the remote tunneling device 307B. The data 306A and 306B may be the same data, such as in the case of a data broadcast, or the data 306A and 306B may be different. For example, data addressed to the remote tunneling device 307A may be an instruction to control a field device, such a valve positioner, that is in communication with the remote tunneling device 307A. Data addressed to the remote tunneling device 307B may be an instruction to check the status of an additional field device that is in communication with the remote tunneling device 307B. Although the example system 300 shows one local station 301 and one local tunneling device 304, in other configurations more than one local station may be in communication with the local tunneling device 304. The system 300 may also include more than one local tunneling device.

FIG. 3 also illustrates a data collector 312 disposed between the local tunneling device 304 and the remote tunneling device 307B. In general, the data collector 312 passes data from a local tunneling device to a remote tunneling device. The data collector 312 passes the data 306B from the local tunneling device 304 to the remote tunneling device 307B, over one or more SCADA networks. However, the data collector 312 may be placed in other locations. For example, the data collector 312 may be disposed between the local tunneling device 304 and the remote tunneling device 307A. In some implementations, the data collector 312 receives data and passes the received data from the local tunneling device without changing the data. In other implementations, the data collector 312 receives data and aggregates, processes, interprets the received data, and/or routes the data to one or more remote tunneling devices. The data that the data collector 312 receives and processes may be a SCADA protocol message.

FIGS. 4 and 5 are block diagrams illustrating an exemplary local station 400 and an exemplary tunneling device 500. The local station 400 may be a local station similar to the local station 301 or the remote station 310 described with respect to FIG. 3. The local station 400 includes a local network connection 410, a message generator 420, an input/output interface 430, a processor 440, and a memory 450.

Generally, the local network connection 410 receives and transmits data from a local network that is in communication with the local station 400. The local network may be, for example, a DCS system in which a high-bandwidth and high-reliability network links a main terminal unit to field devices located within a limited geographical area. The local station 400 may be a field device or it may be a workstation that receives data from a field device and transmit commands to the field device. Examples of field devices include valve positioners that detect and control movement of valves, temperature sensors, controllers, and flow meters. In some implementations, the field devices may be intelligent field devices. In general, an intelligent field device may include a processor and memory, the memory storing instructions to cause the processor to cause the intelligent field device to perform a function. For example, an intelligent field device may be programmed to test the operability of a valve by causing a stem that controls the flow of fluid through the valve to move. More than one device similar to the local station 400 may be connected to the local network. The message generator 420 generates a message based on data received at the local network connection 410. As discussed in more detail with respect to FIG. 6, the message generator 420 generates the message in the DCS protocol.

The local station 400 also includes the input/output interface 430, which may be used to communicate directly with the local station 400. For example, the input/output interface 430 may be a printer port, an additional network connection, and/or an interface that is capable of receiving data from an input device such as a mouse or a keyboard. The local station 400 also includes a processor 440 and a memory 450. For example, the memory 450 may store instructions that, when executed, cause the processor 440 to generate a DCS protocol message using the message generator 420.

FIG. 5 is a block diagram of the exemplary tunneling device 500. The tunneling device 500 may be similar to the local tunneling device 304 or the remote tunneling devices 307A and 307B described above with respect to FIG. 3. In general, the tunneling device 500 receives a message that is packaged as a DCS protocol message or as a SCADA protocol message. The tunneling device 500 packages the received message as a SCADA protocol message or a DCS protocol message.

The tunneling device 500 includes a local network connection 510, a data packager module 520, a SCADA network connection 530, a processor 540, and a memory 550. The local network connection 510 receives DCS protocol messages from a local network, such as a DCS system. The local network connection 510 also places DCS protocol messages onto the local network. Similarly, the SCADA network connection 550 transmits and receives SCADA protocol messages to and from a SCADA network. In some implementations, the local network connection 510 and the SCADA network connection 550 may be combined in a single network connection.

The tunneling device 500 also includes a data packager module 520 that includes a data input routine 522, a data packager 524, a data export routine 526, and a SCADA message buffer 527. The data packager module 520 packages received DCS protocol messages into SCADA protocol messages. The data packager module 520 also receives SCADA protocol messages and unpacks the SCADA protocol messages into DCS protocol messages. The SCADA protocol generally has the ability to store messages for transmission in the event of a temporary communications failure on the customer-supplied network (such as a SCADA network) between the local and remote tunneling devices. The SCADA message buffer 527 may store such messages for transmission.

Figure 6:
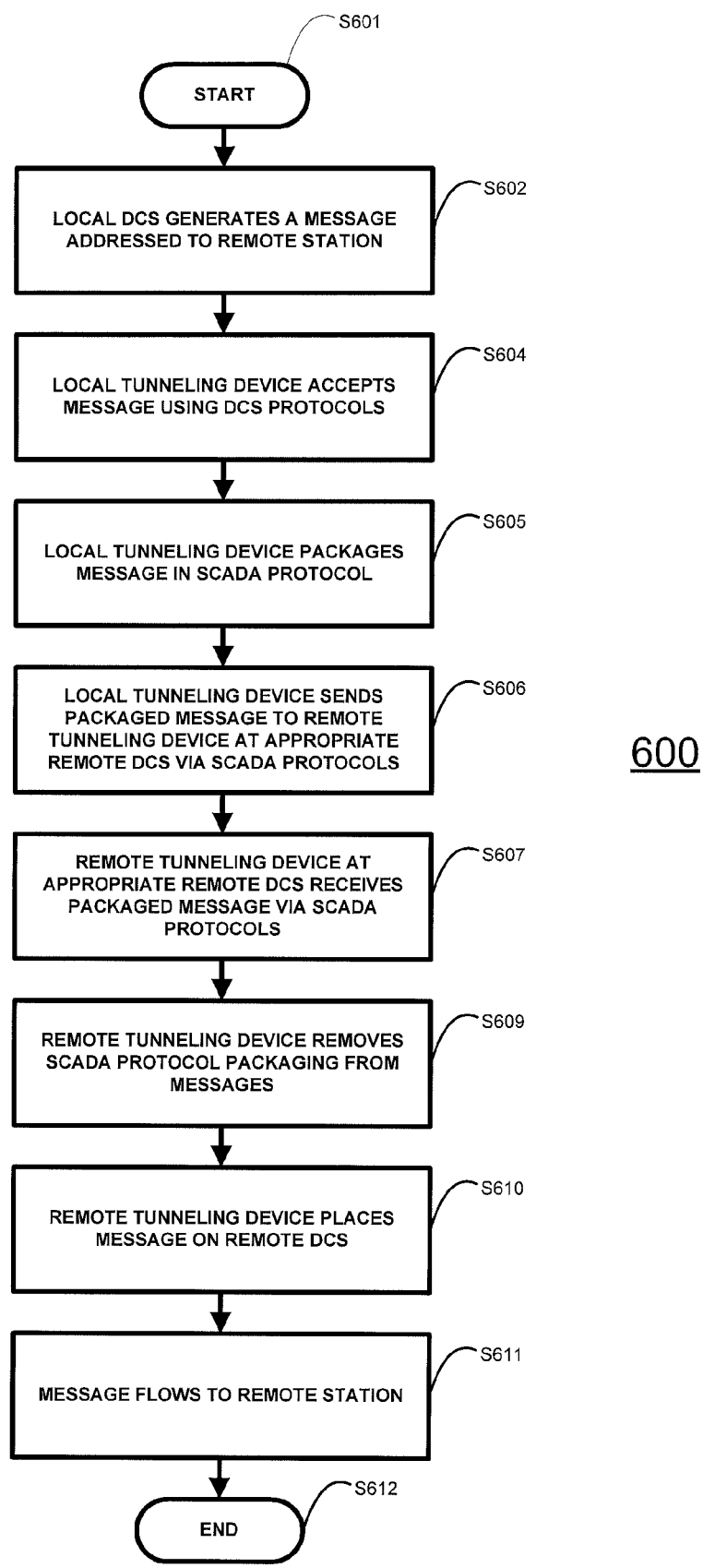
FIGS. 6 and 9 are flow charts illustrating exemplary methods.

FIG. 6 is a flow chart illustrating another exemplary method 600 used by the exemplary system architecture of FIG. 3. Briefly, a message addressed to a remote station is generated at a local DCS, a local tunneling device accepts the message using a DCS protocol, the local tunneling device packages the message in a SCADA protocol. Furthermore, the local tunneling device sends the packaged message to a remote tunneling device at a remote DCS via a SCADA protocol, and the remote tunneling device receives the packaged message. The remote tunneling device removes the SCADA protocol packaging from the message, and places the message on a remote DCS.

In more detail, the method 600 begins (S601), and the local DCS generates a message addressed to a remote station, where the message is transmitted via a DCS protocol (S602). The message may be a message originating from a workstation at a centralized hub addressed to an individual field device in the field, or the message may be data originating a field device, such as a valve positioner, addressed to a workstation at a centralized hub in response to a request from the centralized hub. Notably, the message is addressed to the remote station as if the remote station were part of the local DCS.

The local tunneling device intercepts, accepts, accesses or otherwise receives the message (S604), and packages the message using a SCADA protocol (S605). Accordingly, the local tunneling device acts as a proxy for the equipment at the remote site, by accepting the message in the same manner as any other device on the local DCS.

Once embedded or otherwise packaged in a SCADA protocol message or messages, the local tunneling device transmits the message to the appropriate remote tunneling device at the appropriate DCS, as determined by address information contained within the message (S606). The local tunneling device transmits the message to the remote tunneling device via a SCADA protocol. In some implementations, SCADA protocol messages may be addressed to different DCSs. In this implementation, the local tunneling device may interleave the SCADA protocol messages such that the SCADA protocol messages are sent to the various DCSs at approximately the same time. In some implementations, and as described in more detail with respect to FIG. 7, since certain SCADA protocols support framing, the SCADA protocol message may be divided into portions prior to transmission to the appropriate remote tunneling device at the appropriate DCS. The portions may be, for example, one or more pieces of the message, one or more packets, the entire message, and/or one or more subsets of the message.

The remote tunneling device at the appropriate remote DCS receives the message via a SCADA protocol (S607), and removes the SCADA protocol packaging from the message (S609). If the received message was divided into portions prior to transmission, the remote tunneling device also reassembles the portions, using the framing capabilities supported by certain SCADA protocols. The remote tunneling device then places the message on the remote DCS, as if it had been generated on the remote DCS originally (S610). The message then flows to the remote station using a DCS protocol (S611), and the method 600 ends (S612). If the remote station is a field device, the field device may operate as instructed by the message, and generate a return message for transmission to the local station. The transmission of this return message may occur in the same manner as described above.

Figure 7:
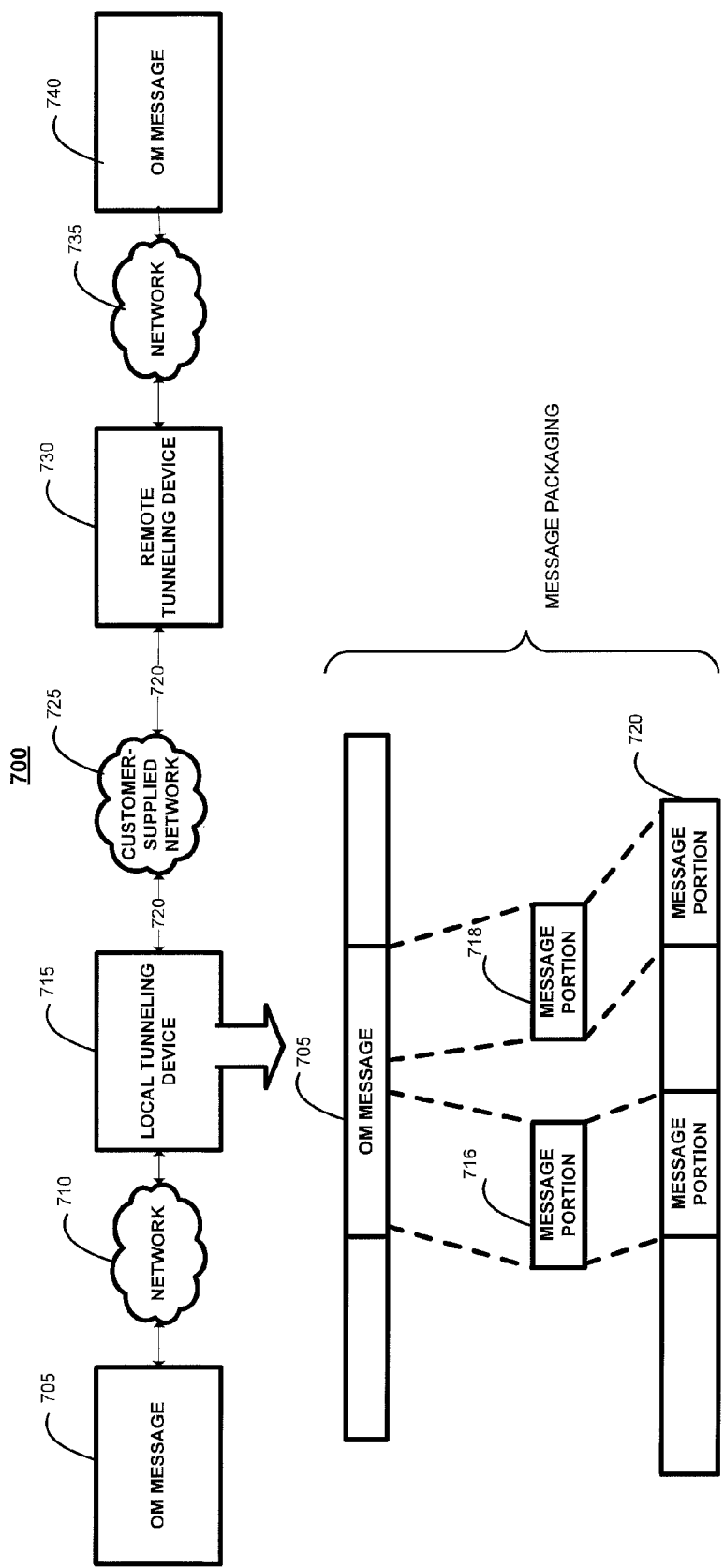
FIGS. 7 and 8 are a block diagrams illustrating exemplary system architectures.

FIG. 7 is a block diagram illustrating an example system architecture 700 used for providing data acquisition and monitoring. In particular, FIG. 7 illustrates the packaging of a DCS protocol operation module (OM) message into a SCADA protocol message. As shown in FIG. 7, a message 705 is transmitted via a network 710 to a local tunneling device 715. The local tunneling device 715 may be similar to the tunneling device 500 discussed above with respect to FIG. 5. The local tunneling device 715 receives the message 705 and packages it into a SCADA protocol message 720.

Packaging the message 705 into the SCADA protocol message 720 includes dividing the message 705 into portions 716 and 718. In other examples, packaging the message 705 may include dividing the message 705 into more or fewer portions. In general, the local tunneling device 715 divides the message 705 into portions when the message is too large to fit within the data portion of a SCADA protocol frame. In FIG. 7, for example, since the OM message 705 is too large to fit within one SCADA protocol frame, it is divided into smaller portions 716 and 718, and placed in two SCADA protocol frames within the SCADA protocol message 720 for transmission.

The local tunneling device transmits the SCADA protocol message 720 to the remote tunneling device 730 through a customer-supplied network 725. The customer-supplied network 720 may be a SCADA network. The remote tunneling device 730 receives the SCADA protocol message 730 and unpacks it into a DCS protocol OM message 740. Generally, the OM message 740 is the same as the message 705. The DCS protocol OM message 740 is transmitted across a network 735.

Figure 8:
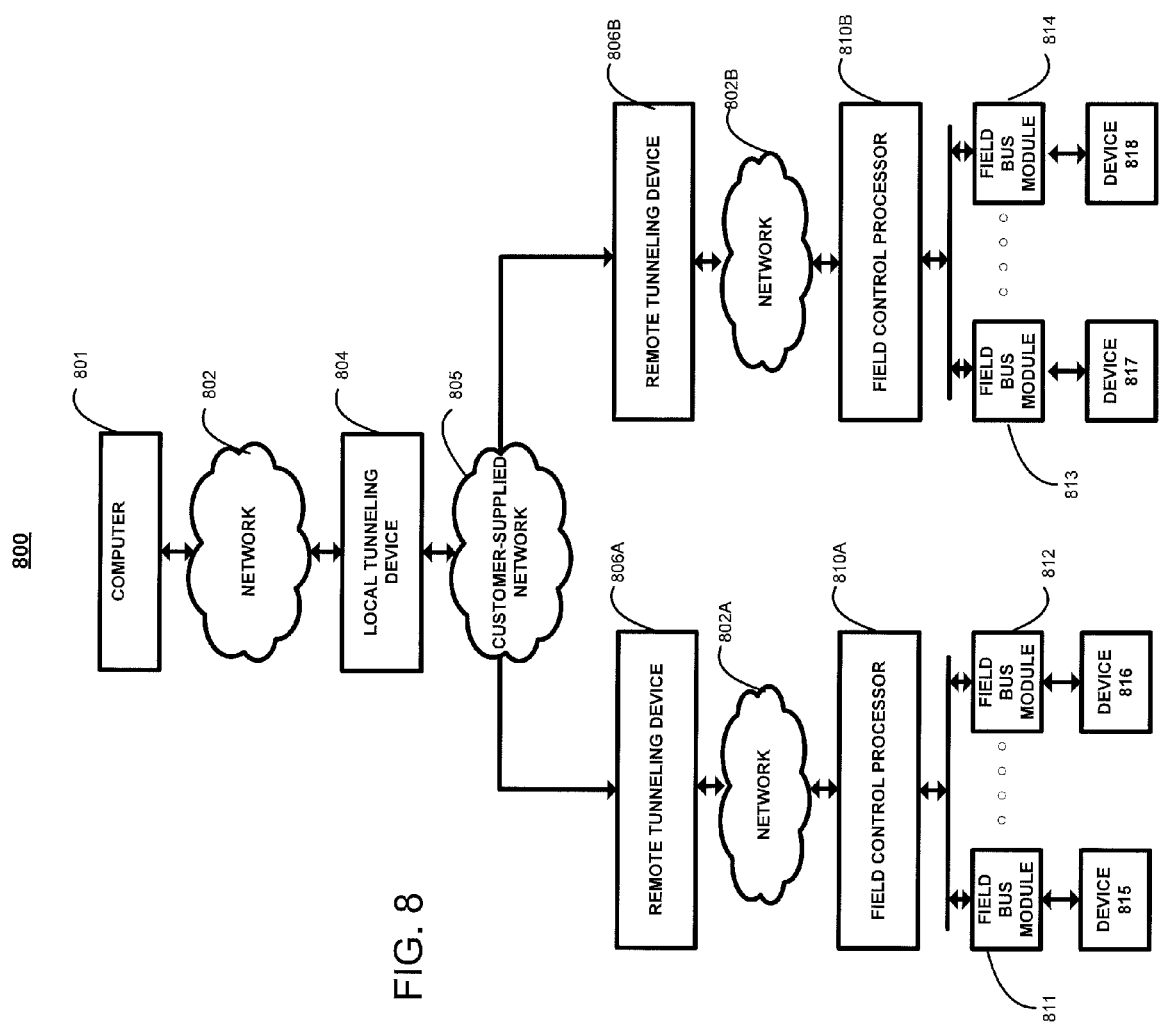

FIG. 8 is a block diagram illustrating an example system architecture 800 used for providing enhanced data acquisition and monitoring functionality. Although, in the discussion below, reference is made to specific equipment configurations, such as OM, field control processor (FCP), APRINT, INVENSYS® I/A SERIES® controllers, or InFusion® workstations, it is understood that these configurations are merely sample arrangements, and that other arrangements are possible using this same approach.

In more detail, the system architecture 800 includes a computer 801. The computer 801 may be similar to the computer 101, or it may be another type of workstation, such as an InFusion® workstation. The computer 801 is connected to a local tunneling device 804 via a network 802. The network 802 may be a DCS network, for example the network 802 may be a local DCS such as the local DCS 307 discussed above with respect to FIG. 3. The DCS network also may be referred to as a control network. The local tunneling device 804 may be similar to the local tunneling device 500 discussed with respect to FIG. 5. The local tunneling device 804 also may be referred to as a workstation-side station computing device. The local tunneling device 804 may be an INVENSYS® I/A SERIES® SCD5200 station computing device.

The local tunneling device 804 is connected to remote station computing devices 806A and 806B via a customer-supplied network 805. The customer-supplied network 805 is a network that tends to have low-reliability and high latency. The customer-supplied network 805 may be a SCADA network that communicates SCADA protocol messages. The SCADA protocol may be, for example, a DNP3 protocol or an IEC101 protocol. In general, the local tunneling device 804 tunnels data the local tunneling device 804 receives via a DCS protocol over a SCADA network for transparent operation of remote DCS systems.

The remote tunneling device 806A communicates with a field control processor (FCP) 810A via network 802A. The network 802A may be similar to the network 802 described above. The network 802A may be considered an OM channel. The network 802A may be a DCS network. The FCP 810A effectuates bidirectional communication between the remote station tunneling device 806A and field bus modules (FBMs) 811 and 812.

In general, the field control processor 810A supervises and/or controls the FBMs 811 and 812 and devices 815 and 816, which respectively communicate with the FBMs 811 and 812. The FCP 810A may be, for example, a INVENSYS® TRICONIX® workstation. The FBMs 811 and 812 transmit data to and receive data from the devices 815 and 816, respectively. For example, the devices 815 and/or 816 may be valves and the FBMs 811 and 812 may communicate instructions to operate the valve to achieve a predetermined amount of flow through the valve. In another example, the FBMs 811 and 812 may communicate instructions to the devices 815 and/or 816 to provide a status indicator associated with the devices 815 and/or 816.

The example shown in FIG. 8 also includes a network 802B, which may be similar to the network 802A described above. The network 802B may be a DCS network. Additionally, the field control processor 810B may be similar to the field control processor 810A, and the field bus modules 813 and 814 may be similar to the field bus modules 811 and 812. The devices 817 and 818 may be field devices such as, for example, valves, pumps, and controllers. Additionally, the devices 817 and 818 may be similar to the devices 815 and 816.

The system 800 may be used to control the flow of fluid through a valve that is part of device 815. For example, the computer 801 may generate a DCS protocol message that includes a command to operate the valve. Notably, the computer 801 is able to operate the valve as if the valve was located on the same local network as the computer, even when the valve is located on a distant network. The message is transmitted to the local tunneling device 804 via the network 802. The local tunneling device 804 packages the DCS protocol message into a SCADA protocol message and transmits it toward the remote tunneling device 806A. The SCADA protocol message is unpacked into a DCS protocol message and transmitted toward the field control processor 810A. The field control processor 810A generates a command to operate the valve according to the command generated by the computer 801.

Figure 9:
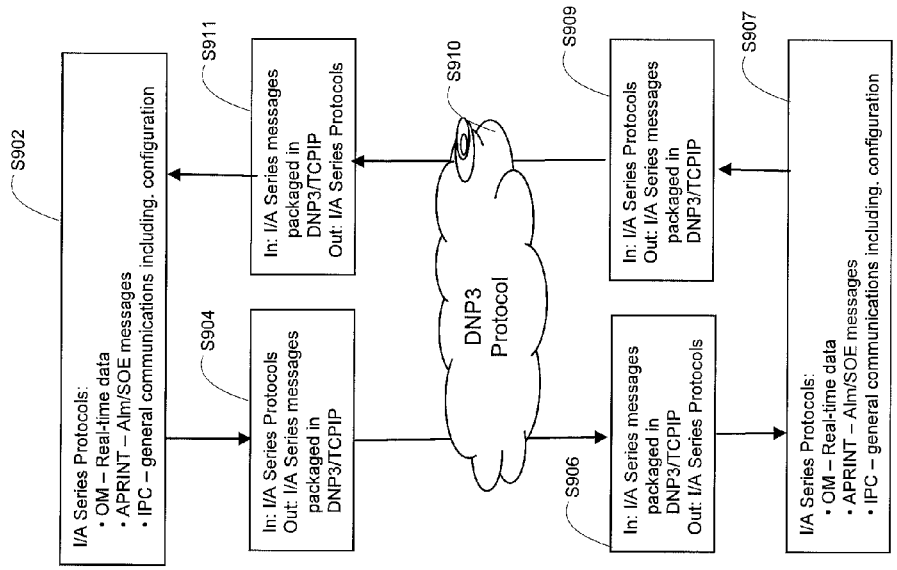

FIG. 9 is a flowchart illustrating an exemplary method 900 for implementing enhanced data acquisition and monitoring functionality. When method 900 begins, a workstation communicates with a workstation-side station computing device, via a DCS network (S902). The workstation transmits messages via an INVENSYS® I/A SERIES® protocol, for example to transmit real-time data via an OM channel, to transmit ALM/SOE messages via an APRINT channel, and to transmit general communication data such as configuration data via an IPC channel.

The workstation-side station computing device receives the data via the INVENSYS® I/A SERIES® protocol, processes the data, and outputs the data packaged as INVENSYS® I/A SERIES® messages, such as via DNP3 or TCP/IP (S904). In an alternate implementation, another protocol is used instead of DNP3. The workstation-side station computing device transmits the INVENSYS® I/A SERIES® messages to a remote station computing device via a shared DNP space (S910).

The remote station computing device receives the INVENSYS® I/A SERIES® messages packaged in DNP3 or TCP/IP from the shared DNP, processes the INVENSYS® I/A SERIES® messages, and outputs data via the INVENSYS® I/A SERIES® protocol (S906). An FCP communicates with the remote station computing device via a switch, and receives and transmits messages via the INVENSYS® I/A SERIES® protocol (S907). For example, the remote station computing device transmits real-time data on an OM channel, transmits ALM/SOE messages via an APRINT channel, and to transmit general communication data such as configuration data via an IPC channel.

By processing data in this manner, workstation-side station computing device is able to extend the reach of INVENSYS® I/A SERIES® communication beyond the DCS network, by tunneling data using SCADA. In this regard, the controller and I/O usage at SCADA locations can be standardized, reducing overall SCADA engineering costs.

Data is received at the remote station computing device from the FCP, using the INVENSYS® I/A SERIES® protocol. The remote station computing device receives the data via the INVENSYS® I/A SERIES® protocol, processes the data, and outputs the data packaged as INVENSYS® I/A SERIES® messages, in DNP3 or TCP/IP from the shared DNP (S909). The remote station computing device transmits the INVENSYS® I/A SERIES® messages to the workstation-side station computing device via a shared DNP space (S910).

The workstation-side station computing device receives the INVENSYS® I/A SERIES® messages packaged in DNP3, processes the INVENSYS® I/A SERIES® messages, and outputs data via the INVENSYS® I/A SERIES® protocol (S911). The workstation communicates with the workstation-side station computing device via a DCS network network, and receives and transmits messages via the INVENSYS® I/A SERIES® protocol (S902).

To its advantage, the enhanced data acquisition and monitoring architecture uses the same controller and input-output modules as INVENSYS® I/A SERIES® control systems, provides for SOE, alarm, and field bus support, for all types of busses. Furthermore, the enhanced data acquisition and monitoring architecture provides FDT access to remote sites.

With regard to DCS, the architecture provides increased input-output and controller production, leading to lower fixed costs. Moreover, the reach of INVENSYS® I/A SERIES® solutions is extended off-shore, over customer-supplied networks, for example to monitor an off-shore oil rig.

Although a number of implementations have been described, it is understood that various modifications may be made without departing from the spirit and scope of the claims. Accordingly, other implementations are also possible.

What is claimed is:

1. A method of operating a tunneling device, the method comprising:
   receiving a distributed control system (DCS) protocol message from a local DCS station, the DCS protocol message comprising a command configured to cause an interaction with a remote DCS station;
   packaging the DCS protocol message into a Supervisory Control and Data Acquisition (SCADA) protocol message;
   identifying the remote DCS station; and
   transmitting the packaged SCADA protocol message toward the identified remote DCS station.

2. The method of claim 1, further comprising:
   receiving a return SCADA protocol message from the remote station, the return SCADA protocol message comprising data configured to cause an interaction with a local DCS station;
   unpacking the return message into a DCS protocol message;
   identifying a local DCS station; and
   transmitting the DCS protocol message to the identified local DCS station.

3. The method of claim 1, further comprising storing data that identifies the remote DCS station.

4. The method of claim 2, further comprising:
   storing data that identifies the local DCS station; and
   storing data that identifies the remote DCS station.

5. The method of claim 1, further comprising:
   storing data received from the local DCS station; and
   accessing the stored data for monitoring by an operator of the tunneling device.

6. The method of claim 2, further comprising:
   storing data received from the local DCS station;
   storing data received from the remote DCS station; and
   accessing the stored data for monitoring by an operator of the tunneling device.

7. The method claim 1, wherein the DCS protocol message comprises an instruction that causes determination of a status of the identified remote DCS station, and further comprising receiving data representing the status of the identified remote DCS station.

8. The method of claim 1, wherein the DCS protocol message comprises an instruction that causes operation of the identified remote DCS station.

9. The method of claim 1, wherein the DCS protocol message comprises an instruction that controls the identified remote DCS station.

10. The method of claim 1, wherein identifying the remote DCS comprises identifying multiple remote DCSs, and wherein the packaged SCADA protocol message is transmitted toward the multiple remote DCS stations.

11. The method of claim 1, wherein the SCADA protocol comprises a Distributed Network Protocol (DNP).

12. The method of claim 1, wherein the SCADA protocol comprises an IEC 60870-5-101 (IEC 101) protocol.

13. A tunneling device comprising:
   a communications interface configured to receive and transmit distributed control system (DCS) protocol messages and to receive and transmit SCADA protocol messages; and
   a processor coupled to a non-transitory machine-readable medium, the medium storing instructions, that, when read by a machine operate to cause the processor to:
      receive a DCS protocol message from a local station, the DCS protocol message comprising a command configured to cause an interaction with a remote station,
      package the DCS protocol message into a Supervisory Control and Data Acquisition (SCADA) protocol message,
      identify the remote station, and
      transmit the packaged SCADA protocol message toward the remote station.

14. The device of claim 13, wherein the medium further stores instructions that, when read by a machine, cause the processor to:
   receive a return SCADA protocol message from the remote station, the return SCADA protocol message comprising data configured to cause an interaction with a local station;
   unpack the return message into a DCS protocol message;
   identify a local station; and
   transmit the DCS protocol message to the identified local station.

15. The device of claim 13, wherein the medium further stores instructions that, when read by a machine, cause the processor to store data that identifies the remote station.

16. The device of claim 14, wherein the medium further stores instructions that, when read by a machine, cause the processor to:
   store data that identifies the local station; and
   store data that identifies the remote station.

17. The device of claim 13, wherein the medium further stores instructions that, when read by a machine, cause the processor to:
   store data received from the local station; and
   access the stored data for monitoring by an operator of the tunneling device.

18. The device of claim 14, wherein the medium further stores instructions that, when read by a machine, cause the processor to:
   store data received from the local station;
   store data received from the remote station; and
   access the stored data for monitoring by an operator of the tunneling device.

19. A system comprising:
   a local station configured to receive and transmit distributed control system (DCS) protocol messages; and
   a tunneling device configured to communicate with the local station, the tunneling device comprising:
      a communications interface configured to receive and transmit DCS protocol messages and to receive and transmit SCADA protocol messages; and
      a processor coupled to a non-transitory machine-readable medium, the medium storing instructions, that, when read by a machine operate to cause the processor to:
         receive a DCS protocol message from the local station, the DCS protocol message comprising a command configured to cause an interaction with a remote station, package the DCS protocol message into a Supervisory Control and Data Acquisition (SCADA) protocol message,
identify the remote station, and
transmit the packaged SCADA protocol message toward the remote station.

20. The system of claim 19, wherein the local station comprises a field device.

21. The system of claim 19, wherein the tunneling device is configured to receive DCS protocol messages from and transmit DCS protocol messages to more than one local station.

22. The system claim 19, wherein the remote station comprises a field control processor.

* * * * *